(12) United States Patent
Lee et al.

(10) Patent No.: US 8,518,127 B2
(45) Date of Patent: Aug. 27, 2013

(54) SOLID CAPACITOR AND MANUFACTURING METHOD THEREOF

(75) Inventors: Wei-Chih Lee, New Taipei (TW); Ming-Tsung Chen, Hsinchu (TW)

(73) Assignees: INPAQ Technology Co., Ltd., Miaoli County (TW); APAQ Technology Co., Ltd., Miaoli County (TW)

( * ) Notice: Subject to any disclaimer, the term of this patent is extended or adjusted under 35 U.S.C. 154(b) by 160 days.

(21) Appl. No.: 13/176,736

(22) Filed: Jul. 5, 2011

(65) Prior Publication Data

US 2013/0010402 A1    Jan. 10, 2013

(51) Int. Cl.
*H01G 9/00* (2006.01)

(52) U.S. Cl.
USPC ........................................... 29/25.03

(58) Field of Classification Search
None
See application file for complete search history.

(56) References Cited

U.S. PATENT DOCUMENTS

| | | | |
|---|---|---|---|
| 4,569,739 A * | 2/1986 | Klinkowski | 204/517 |
| 6,519,135 B2 * | 2/2003 | Sano et al. | 361/510 |
| 2002/0167786 A1 * | 11/2002 | Sano et al. | 361/509 |
| 2005/0117278 A1 * | 6/2005 | Suenaga et al. | 361/523 |

* cited by examiner

*Primary Examiner* — Seahvosh Nikmanesh
(74) *Attorney, Agent, or Firm* — Li & Cai Intellectual Property (USA) Office (57) ABSTRACT

A manufacturing method of solid capacitors includes the following steps. First step is forming a plurality of separated adhesive layer on an insulating substrate. Next step is disposing valve-metal wires on the adhesive layers. Next step is forming a conductive layer on the adhesive layer and the valve-metal wires. Next step is forming a dielectric structure on the exposed surface of the valve-metal wires and the conductive layer. Next step is forming a hydrophobic layer and a conductive unit. Next step is separating the formed structures as individual capacitors. Next step is packaging the formed structures and forming terminals connected to the formed structures.

10 Claims, 8 Drawing Sheets

SOLID CAPACITOR AND MANUFACTURING METHOD THEREOF

BACKGROUND OF THE INVENTION

1. Field of the Invention

The present invention relates to a capacitor and a manufacturing method thereof. In particular, the present invention relates to a solid electrolytic capacitor and a manufacturing method for solid electrolytic capacitors.

2. Description of Related Art

Capacitors are largely classified into electrolytic capacitors and non-electrolytic capacitors. There are different electrolytic capacitors, such as aluminum electrolytic capacitors and tantalum electrolytic capacitors classified by the material of the anode. On the other hand, electrolytic capacitors are roughly divided into two kinds according to the kind of the electrolyte layer; a liquid electrolytic capacitor and a solid electrolytic capacitor. Compared to aluminum electrolytic capacitors, tantalum electrolytic capacitors have wide temperature range, little DC leakage, and low inductance.

A traditional method of the tantalum electrolytic capacitors is providing an electrode by sintering tantalum powders via a mold. However, the traditional method has relatively low efficiency because the mold is used to form a single capacitor at one time. As a result, the manufacturing quantity may not meet the requirement of commercial marketing.

On the other hand, the capacitor materials are connected to a frame which is then connected to an external PCB in the traditional tantalum electrolytic capacitor. Therefore, the manufacturing method is more complex and the size of the final capacitor product is too large to be used in the electronic devices with small volume. Moreover, the contact of the capacitor materials and the frame increase the impedance. In addition, the frame has transmitting impedance. The above-mentioned impedance results in the higher ESR characteristic of the solid electrolytic capacitors.

SUMMARY OF THE INVENTION

One object of the instant disclosure is providing a solid capacitor and a manufacturing method thereof. The manufacturing method of the instant disclosure is a large scale batch manufacturing method which can be applied to manufacture multi capacitors in one procedure. Therefore, the manufacturing method of the instant disclosure has high manufacturing efficiency.

The instant disclosure provides a manufacturing method which has the following steps.

Step 1 is providing an insulating substrate having at least two capacitor areas.

Step 2 is providing a first formation step for forming an adhesive layer having a valve metal on the capacitor areas respectively.

Step 3 is providing a plurality of valve-metal wires on the adhesive layer.

Step 4 is providing a second formation step for forming a conductive layer having the valve metal on the capacitor areas respectively, and the conductive layer covers the adhesive layer and the valve-metal wires.

Step 5 is providing an auxiliary conductive unit for an electrolytic oxidation treatment. The auxiliary conductive unit is electrically connected with the valve-metal wires, and a dielectric structure is formed on the exposed surface of the valve-metal wires and the conductive layer.

Step 6 is forming a hydrophobic layer on the valve-metal wires, and forming a conductive unit to cover the dielectric structure.

Step 7 is providing a cutting step to separate the two capacitor areas.

Step 8 is providing a packaging step.

Step 9 is providing a step for forming terminals.

The instant disclosure provides a solid capacitor. The solid capacitor includes an insulating substrate, an anode, a dielectric structure, a conductive unit covering the dielectric structure, a hydrophobic layer, a packaging layer and two terminals. The anode is formed by combining an adhesive layer having a valve metal, a plurality of valve-metal wires and a conductive layer. The dielectric structure (i.e., an oxide layer) is formed on the exposed surface of the valve-metal wires and the conductive layer by an electrolytic-oxidized method. The adhesive layer partially covers the insulating substrate, the valve-metal wires are disposed on the adhesive layer and the insulating substrate, and the conductive layer covers the adhesive layer and the valve-metal wires. The conductive unit, which is referred to a cathode of the capacitor, covers the dielectric structure. The conductive unit is constructed by a conductive polymer layer and one or multi metal layers. The hydrophobic layer is disposed on the valve-metal wires between the two conductive units. The packaging layer covers the middle portion of the solid capacitor and the two ends of the solid capacitor are exposed. Two terminals are electrically connected with the two exposed ends of the solid capacitor to form an anode contact and a cathode contact.

The instant disclosure further provides another manufacturing method which has the following steps.

Step 1 is providing an insulating substrate having at least two capacitor areas.

Step 2 is providing a first formation step for forming an adhesive layer having carbon material on the capacitor areas respectively.

Step 3 is providing a plurality of valve-metal wires on the adhesive layer.

Step 4 is providing a second formation step for forming a conductive layer having the valve metal on the capacitor areas respectively, and the conductive layer covers the adhesive layer and the valve-metal wires.

Step 5 is providing an auxiliary conductive unit for an electrolytic oxidation treatment. The auxiliary conductive unit is electrically connected with the valve-metal wires, and a dielectric structure is formed on the exposed surface of the valve-metal wires and the conductive layer.

Step 6 is forming a hydrophobic layer on the valve-metal wires, and forming a conductive unit to cover the dielectric structure.

Step 7 is providing a cutting step to separate the two capacitor areas.

Step 8 is providing a packaging step.

Step 9 is providing a step for forming terminals.

The instant disclosure further provides another solid capacitor. The solid capacitor includes an insulating substrate, an anode, a dielectric structure, a conductive unit covering the dielectric structure, a hydrophobic layer, a packaging layer and two terminals. The anode is formed by sintering a plurality of valve-metal wires and a conductive layer. The dielectric structure (i.e., an oxide layer) is formed on the exposed surface of the valve-metal wires and the conductive layer by an electrolytic-oxidized method. The valve-metal wires are disposed on the adhesive layer, which is vaporized, and the insulating substrate. The conductive layer covers the adhesive layer and the valve-metal wires. The conductive unit, which is referred to a cathode of the capacitor, covers the dielectric structure. The conductive unit is constructed by a conductive polymer layer and one or multi metal layers. The hydrophobic layer is disposed on the valve-metal wires between the two conductive units. The packaging layer covers the middle portion of the solid capacitor and the two ends of the solid capacitor are exposed. Two terminals are electrically connected with the two exposed ends of the solid capacitor to form an anode contact and a cathode contact.

The method may improve the manufacturing efficiency of the solid capacitors. Moreover, the solid capacitor of the instant disclosure has no frame thereon and the size of the capacitor may be reduced. Thus, the capacitor products are suitable for electronic devices of small sizes. On the other hand, the electrical properties of the capacitors meet the requirement of commercial applications.

For further understanding of the present invention, reference is made to the following detailed description illustrating the embodiments and examples of the present invention. The description is for illustrative purpose only and is not intended to limit the scope of the claim.

DETAILED DESCRIPTION OF THE PREFERRED EMBODIMENTS

The present invention provides a solid capacitor and a manufacturing method thereof. The instant disclosure may meet the requirement of high production-manufacturing efficiency by a large scale batch manufacturing method. The solid capacitor manufactured by the instant method may have improved electrical properties.

For further detail, a tantalum (Ta) solid capacitor is taken as an exemplary embodiment.

Figure 1A:
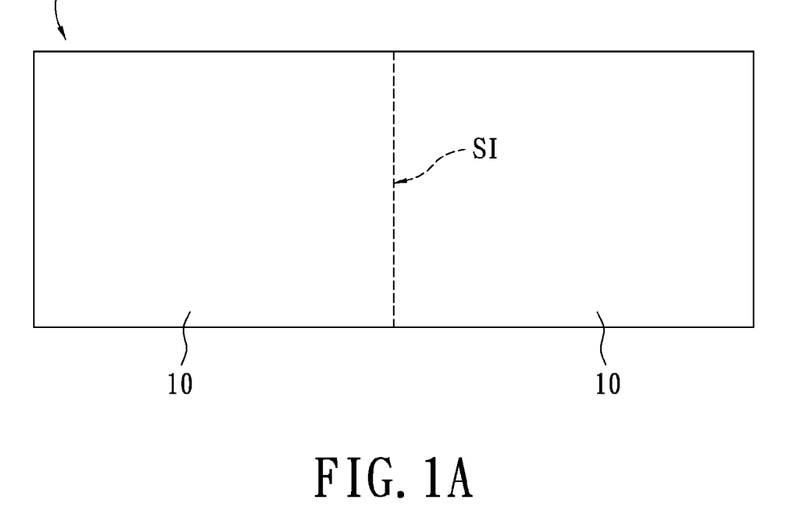
FIG. 1A shows a top view of an insulating substrate of the instant disclosure.
Figure 1B:
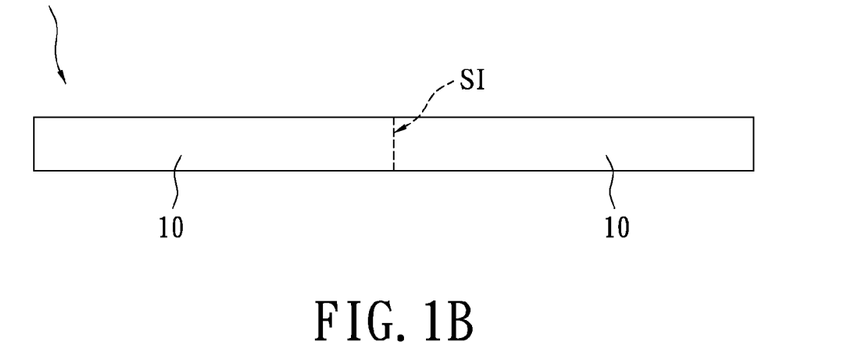
FIG. 1B shows a side view of an insulating substrate of the instant disclosure.

The manufacturing method of the instant disclosure includes the following steps. Please refer to FIGS. 1A to 1B; Step 1 is providing an insulating substrate 1, which has a plurality of capacitor areas 10, for example, there are two capacitor areas 10 defined by the scribe line "SI" on the insulating substrate 1. Each capacitor area 10 is used to stack the capacitor material thereon so as to form a final capacitor product after the steps hereinafter. Therefore, the instant disclosure provides a method for manufacturing a plurality of capacitors on the insulating substrate 1 to produce the capacitors efficiently. The problem of manufacturing a capacitor at one time by the traditional method may be solved. The insulating substrate 1 may be a ceramic substrate or a substrate made of insulating materials.

Figure 2A:
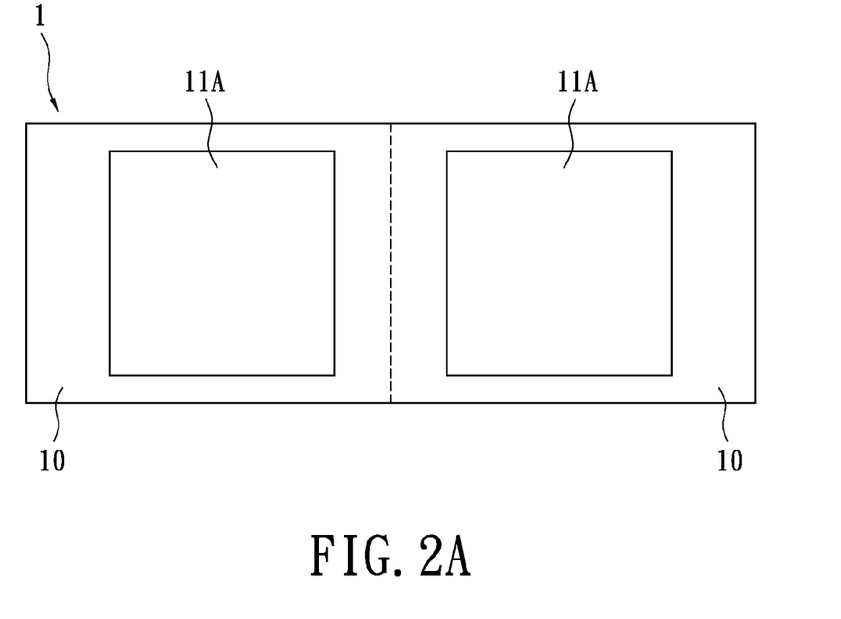
FIG. 2A shows the top view of the first formation step according to the instant disclosure.
Figure 2B:
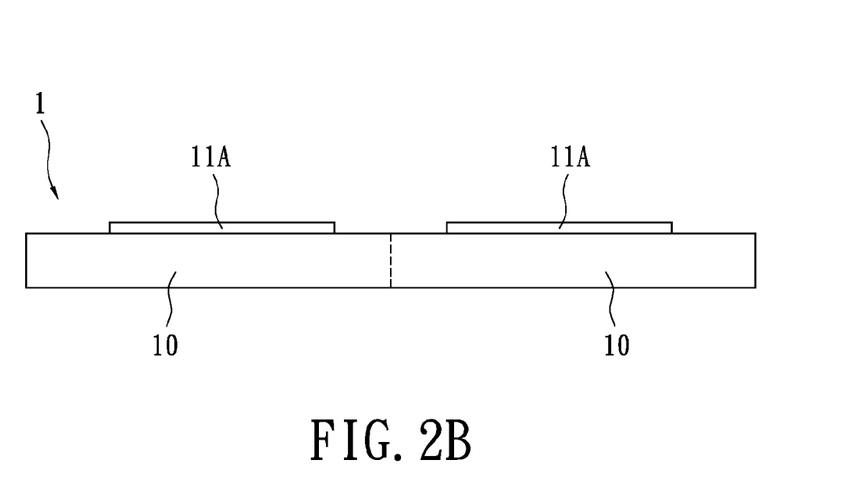
FIG. 2B shows the side view of the first formation step according to the instant disclosure.

Please refer to FIGS. 2A to 2B; Step 2 is providing a first formation step for forming an adhesive layer 11A having a valve metal, such as titanium (Ti), tantalum (Ta), zirconium (Zr), Hafnium (Hf), niobium (Nb) on the capacitor areas 10 respectively. In the instant disclosure, an adhesive paste having Ta powders is respectively printed on the capacitor areas 10. For a main purpose, the adhesive layer 11A is provided for functions of adhesion and connection to fix the stacked material thereon. Furthermore, the valve metal content of the adhesive layer 11A may be provided for the capacity of the final product. Preferably, the valve metal may be Ta, Nb, or mixture of Ta and Nb.

Figure 3A:
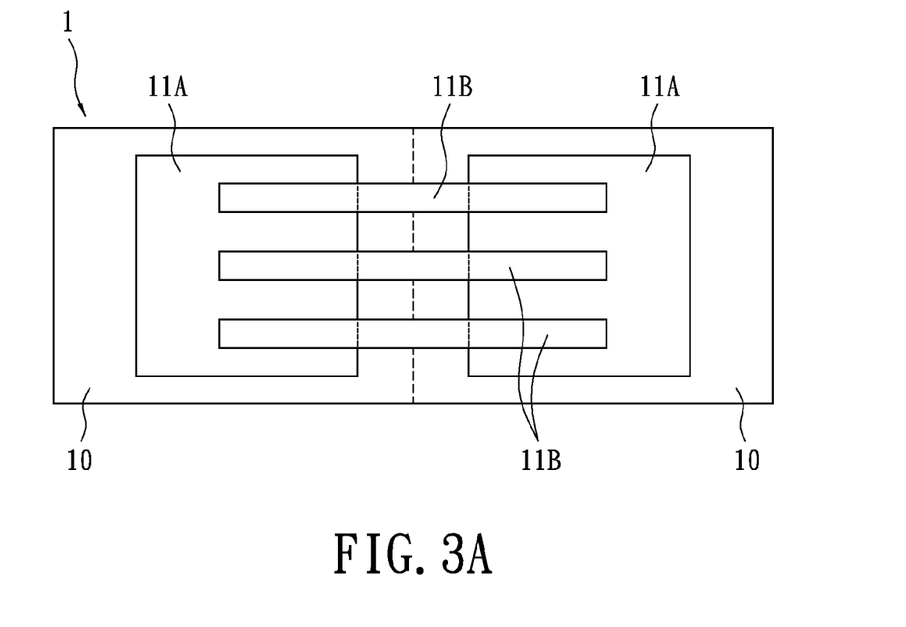
FIG. 3A shows the top view of the valve-metal wires according to the instant disclosure.
Figure 3B:
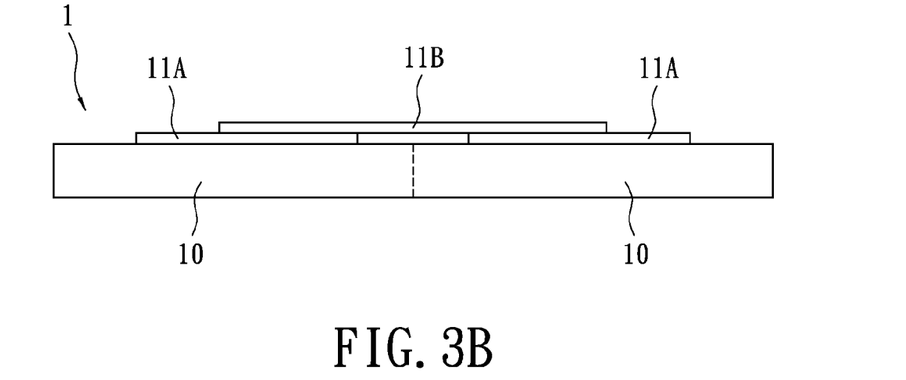
FIG. 3B shows the side view of the valve-metal wires according to the instant disclosure.

As shown in FIGS. 3A, 3B, step 3 is providing a plurality of valve-metal wires 11B on the adhesive layers 11A. In the exemplary embodiment, three Ta bars are put across on the two adhesive layers 11A and the Ta bars are fixed on the adhesive layers 11A because of the adhesion.

Figure 4A:
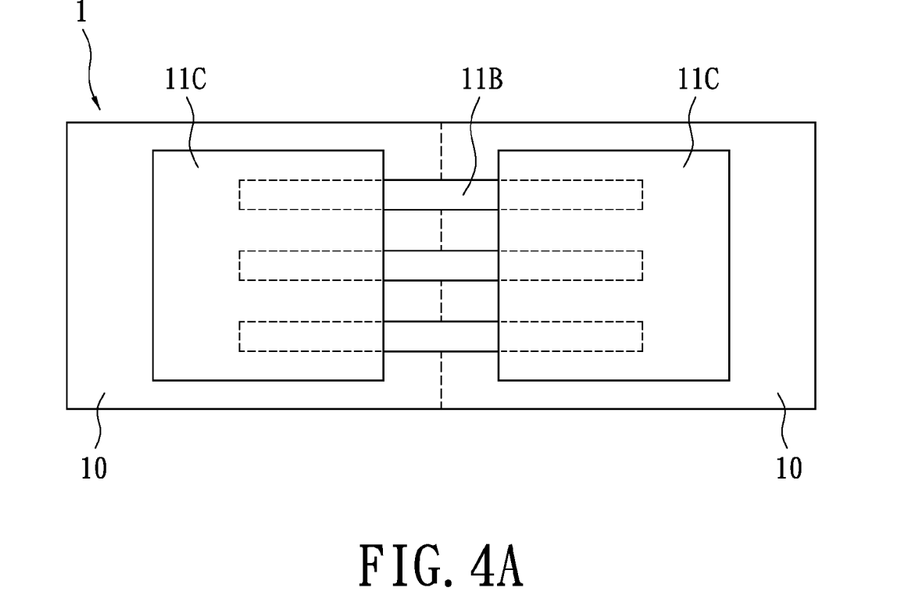
FIG. 4A shows the top view of the second formation step according to the instant disclosure.
Figure 4B:
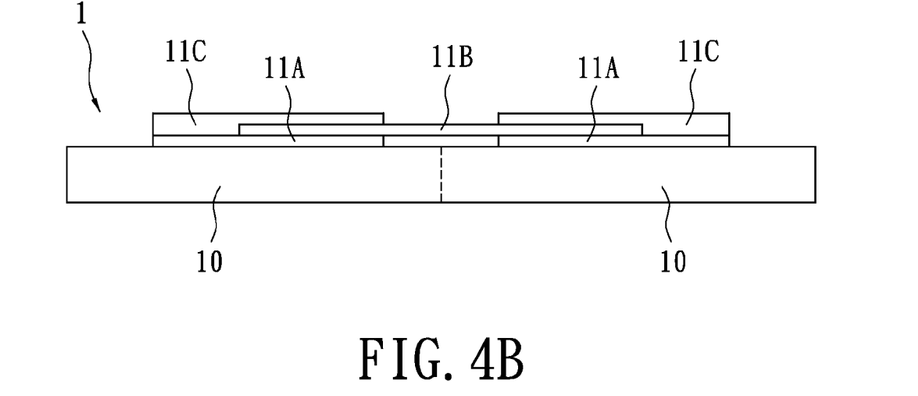
FIG. 4B shows the side view of the second formation step according to the instant disclosure.

Please refer to FIGS. 4A and 4B; step 4 is providing a second formation step for forming a conductive layer 11C having the valve metal on the capacitor areas 10 respectively and the conductive layer 11C covers the adhesive layer 11A and the valve-metal wires 11B. In the exemplary embodiment, a paste having Ta powders is printed on the adhesive layer 11A and the valve-metal wires 11B on each capacitor areas 10. The adhesive layer 11A, the valve-metal wires 11B and conductive layer 11C are combined as an anode of the capacitor.

After the second formation step, the manufacturing method further includes a sintering step. After the sintering step, the adhesive layer 11A, the valve-metal wires 11B and conductive layer 11C are combined electrically as a sintered electrode. The sintered electrode of the above-mentioned 11A, 11B, 11C may have a strengthened structure with dimensional stability.

Figure 5A:
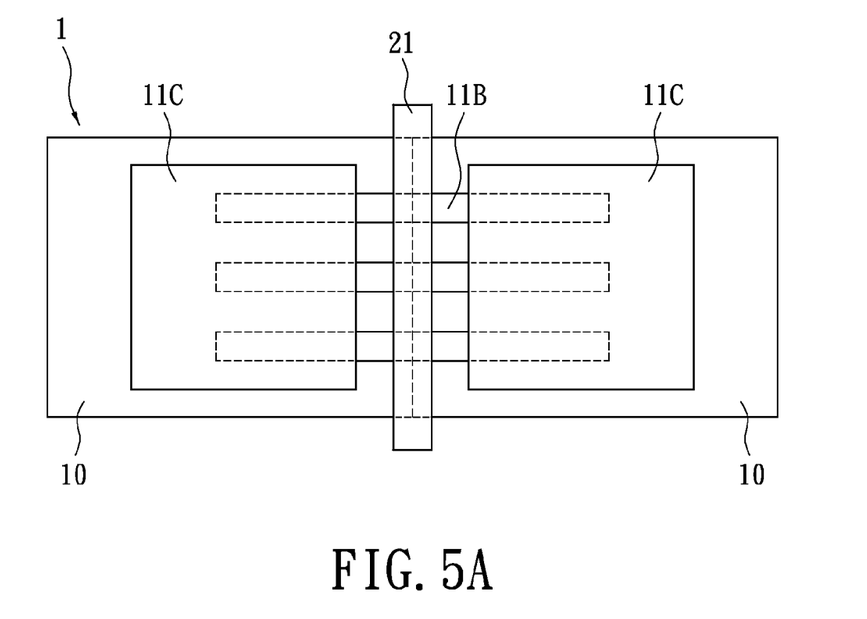
FIG. 5A shows the top view of the auxiliary conductive unit according to the instant disclosure.
Figure 5B:
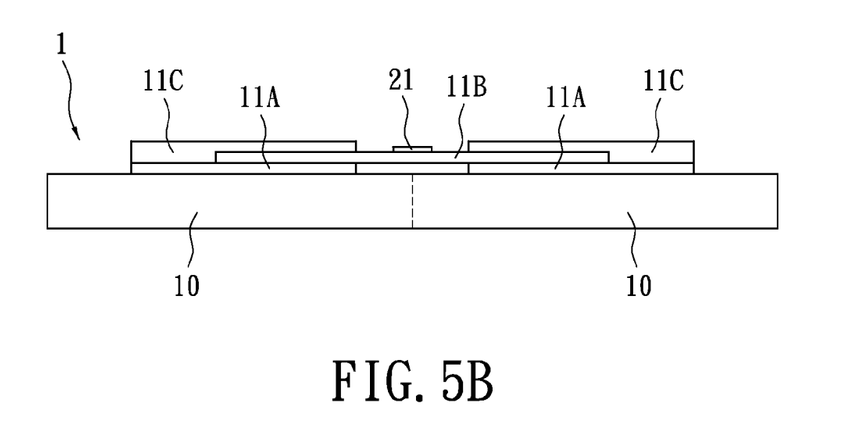
FIG. 5B shows the side view of the auxiliary conductive unit according to the instant disclosure.

Please refer to FIGS. 5A and 5B; step 5 is providing an auxiliary conductive unit 21 for an electrolytic oxidation treatment. The exposed surface of the valve-metal wires 11B and the conductive layer 11C may form a dielectric structure thereon after the electrolytic oxidation treatment. For the simplicity, the dielectric structure is not shown in the drawing. In detail, the Ta material (i.e., the valve metal) in the exposed surface of the valve-metal wires 11B and the conductive layer 11C is oxidized as an oxide material, for example $Ta_2O_5$, through the electrolytic oxidation treatment.

In one exemplary embodiment, an auxiliary conductive metal layer, such as Ta layer or nickel (Ni) layer, is formed by a spattering method, which performs as the auxiliary conductive unit 21. The auxiliary conductive metal layer is formed substantially along the scribe line "SI" and is electrically connected with the valve-metal wires 11B. The auxiliary conductive metal layer may be electrically connected to an external power supply to perform an electrical-chemical method so as to oxide the Ta powders in the surface of the valve-metal wires 11B and the conductive layer 11C to a dielectric structure of $Ta_2O_5$.

In an alternative exemplary embodiment, a conductive tool is performs as the auxiliary conductive unit 21. The conductive tool, such as a metal plate, is fixed on and electrically connected to the valve-metal wires 11B. The conductive tool may be electrically connected to an external power supply to perform an electrical-chemical method so as to oxide the Ta powders in the surface of the valve-metal wires 11B and the conductive layer 11C to a dielectric structure of $Ta_2O_5$.

The Ta metal of the adhesive layer 11A, the valve-metal wires 11B and conductive layer 11C performs as an anode of the capacitor. On the other hand, the dielectric structure of $Ta_2O_5$ performs as a dielectric layer formed between the anode and the cathode of the capacitor. Please note that the auxiliary conductive unit 21 plays an auxiliary role in the electrical-chemical method to oxide the Ta material; therefore, the auxiliary conductive unit 21 is not shown in the drawings after the electrical-chemical method. Hereinafter, a cathode, a packaging layer and terminals are formed.

Figure 6A:
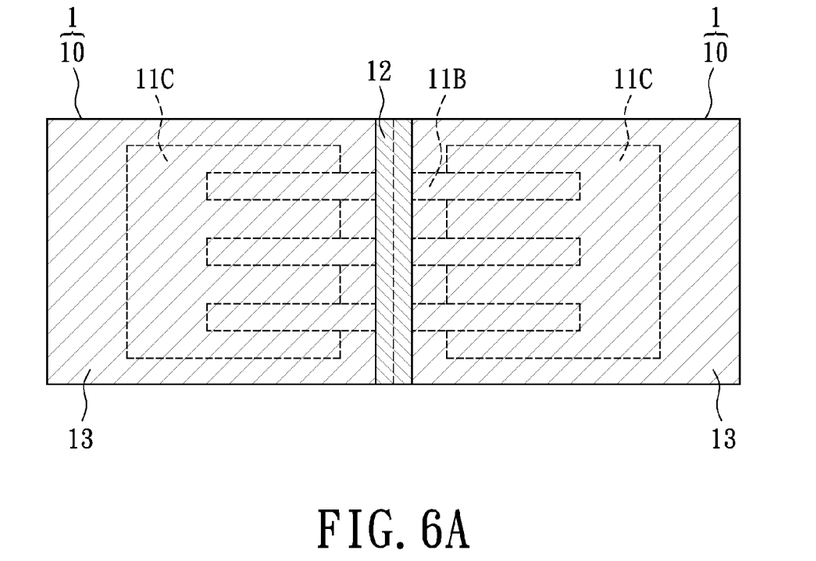
FIG. 6A shows the top view of the hydrophobic layer and the conductive unit according to the instant disclosure.
Figure 6B:
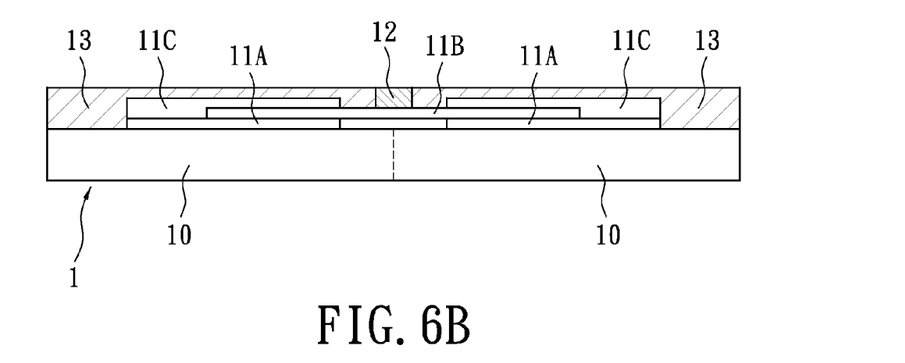
FIG. 6B shows the side view of the hydrophobic layer and the conductive unit according to the instant disclosure.

Please refer to FIGS. 6A and 6B; next step is forming a hydrophobic layer 12 on the valve-metal wires. As shown, the hydrophobic layer 12 is formed substantially along the scribe line "SI". The hydrophobic layer 12 is applied for preventing the capacitor structures from the chemicals in the wet treatment. Next step is forming a conductive unit 13 to cover the dielectric structure, i.e., the oxidation layer on the surface of the valve-metal wires 11B and conductive layer 11C. In the exemplary embodiment, the conductive unit 13 at least includes conductive polymer, such as polyethylenedioxythiophene (PEDOT), and preferably includes carbon slurry and silver slurry. In structural detail, the coverage of PEDOT on the dielectric structure is referred to an electrolytic layer, and further the carbon slurry and silver slurry are coated on the electrolytic layer to form the conductive unit 13 which is referred to the cathode of the capacitor.

Figure 7:
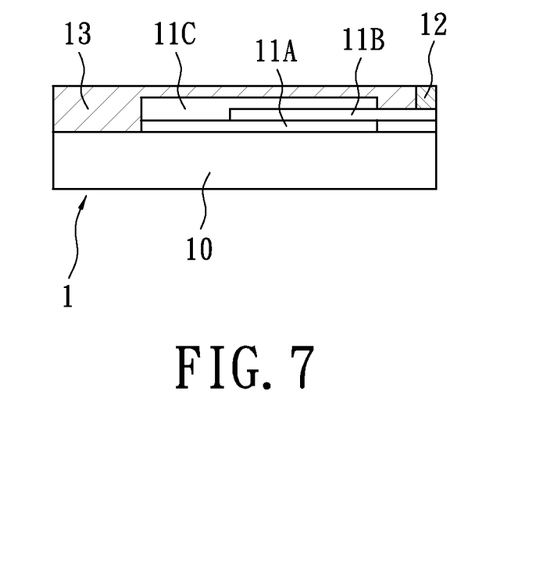
FIG. 7 shows the cutting step according to the instant disclosure.

Please refer to FIG. 7; the next step is a cutting step to separate the two capacitor areas 10 which has complete capacitor thereon. For example, laser and cutting saws may be applied in the cutting step. After cutting along the scribe line "SI", the two capacitor areas 10 and the structures are separated as two individual devices. In detail, the laser is used in advance to form grooves between the two capacitor areas 10 and then the saw is used to separate the two capacitor areas 10 by cutting the substrate 1 through the grooves. Therefore, the separated capacitor area 10 has complete capacitor structures, such as the anode, the dielectric layer and the cathode thereon. Hereinafter, the steps of forming the packaging layer and terminals are introduced.

Figure 8:
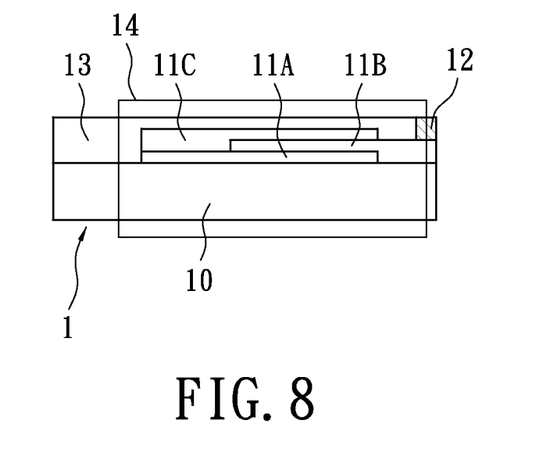
FIG. 8 shows the packaging step according to the instant disclosure.

Please refer to FIG. 8; the next step is providing a packaging step to form a packaging layer 14 which covers the separated capacitor area 10 and capacitor structures. As shown, an insulating packaging resin is used to cover the capacitor structures, such as the conductive unit 13, the valve-metal wires 11B and conductive layer 11C. The packaging layer 14 may protect the capacitor structures from moisture. In addition, the packaging layer 14 exposes a part of the cathode and the anode so as to pull the conductive electrodes.

Figure 9:
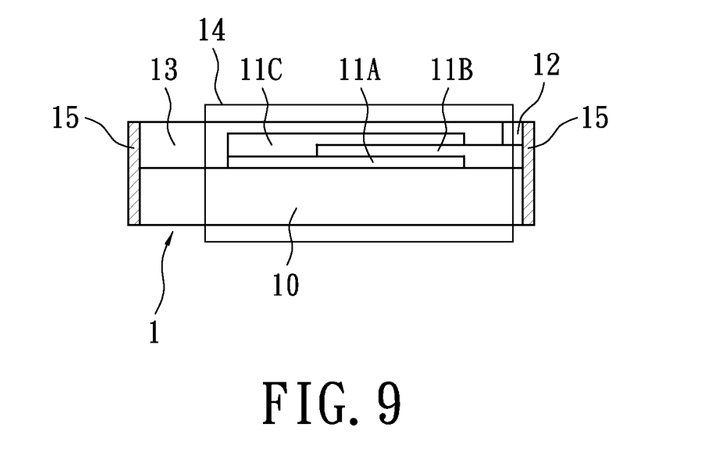
FIG. 9 shows the terminals according to the instant disclosure.

Please refer to FIG. 9; the next step is forming terminals 15. The terminals 15 are coupled to the exposed portion of the capacitor anode and the exposed portion of the capacitor cathode through the packaging layer 14. In an exemplary embodiment, the terminals 15 may be formed by metallization methods such as Ni-sputtering or silver-coating. In addition, the terminals 15 further have solderable or weldable surfaces which may be a Ni/Sn layer. Thus, the final capacitor product may be mounted and connected in the electronic device by a welding method.

Accordingly, the insulating substrate 1 may be designed to have a plurality of capacitor areas 10 and then a plurality of capacitors is formed corresponding to the capacitor areas 10. In other words, the instant disclosure provides a large scale batch manufacturing method for solid capacitors so that the manufacturing efficiency is improved. Through the above-mentioned steps, a plurality of solid capacitors is manufactured. Each solid capacitor includes an insulating substrate 1, an adhesive layer 11A having a valve metal, the valve-metal wires 11B and a conductive layer 11C on the insulating substrate 1, a dielectric structure (not shown) formed on the exposed surface of the valve-metal wires 11B and the conductive layer 11C, a hydrophobic layer 12 disposed on the valve-metal wires 11B, a conductive unit 13 covering the dielectric structure, a packaging layer 14 and two terminals 15. In detail, the adhesive layer 11A is used to fix the valve-metal wires 11B and a conductive layer 11C on the insulating substrate 1. Further, the sintered adhesive layer 11A, the valve-metal wires 11B and the conductive layer 11C are referred to the anode of the solid capacitor. In other words, the adhesive layer 11A, the valve-metal wires 11B and the conductive layer 11C may be combined as a sintered electrode and the surface of the sintered electrode can be oxidized. In the exemplary embodiment, the insulating substrate 1 has two separated adhesive layers 11A. Three Ta bars (i.e., the valve-metal wires 11B) are disposed across on the two adhesive layers 11A. The conductive layer 11C is formed on the valve-metal wires 11B of each capacitor area 10 and used to form the anode contact. The exposed surfaces, such as top surfaces and lateral surfaces of the valve-metal wires 11B and the conductive layer 11C can be transferred to a dielectric structure, i.e., an oxide layer of the valve metals. The conductive unit 13 coves the dielectric structure of each capacitor area 10. The hydrophobic layer 12 is disposed on the valve-metal wires 11B and between the conductive units 13 on the two capacitor areas 10. The hydrophobic layer 12 covers the valve-metal wires 11B to protect the valve-metal wires 11B from the chemicals and liquid in the wet processes. The conductive unit 13 is referred to the cathode of the capacitor and at least has a conductive polymer layer. For example, one or multi conductive layers is electrically connected to the conductive polymer layer for pulling out of the cathode contact. The packaging layer 14 covers the substrate 1 and capacitor structures, such as the anode, the cathode and the dielectric layer, and further exposes the partial portion of the anode and the cathode. As shown in FIG. 9, the packaging layer 14 covers the middle portion of the solid capacitor, and the two ends of the solid capacitor are exposed. The terminals 15 are formed on the exposed portions of the anode and the cathode so as to form the anode contact and the cathode contact. In addition, the terminals 15 further have solderable or weldable surfaces.

Figure 10:
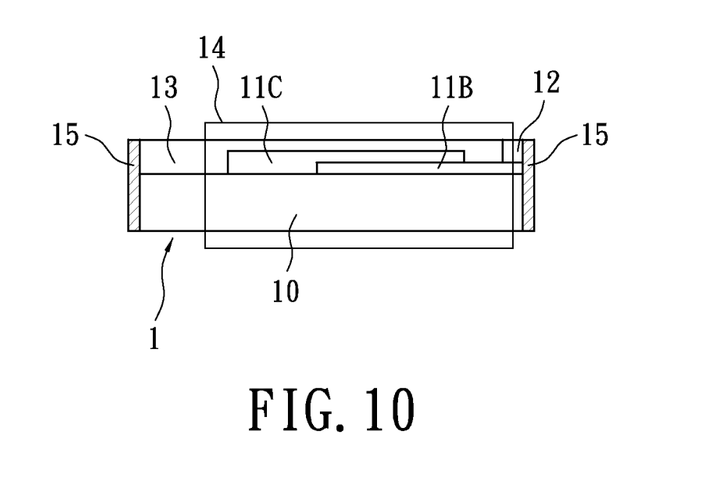
FIG. 10 shows another capacitor according to the instant disclosure.

On the other hand, the instant disclosure provides an alternative method to manufacture the solid capacitor. The difference between the two methods is that the adhesive layer 11A has carbon material. In other words, the adhesive layer 11A having carbon material is similarly used to fix the valve-metal wires 11B and the conductive layer 11C on the insulating substrate 1. However, the adhesive layer 11A is vaporized during the sintering step. Therefore, the adhesive layer 11A does not exist in the final product. The rest steps may be referenced to the above-mentioned embodiment.

Accordingly, through the steps, a plurality of solid capacitors is manufactured. Each solid capacitor includes an insulating substrate 1, the valve-metal wires 11B and a conductive layer 11C on the insulating substrate 1, a dielectric structure (not shown) formed on the exposed surface of the valve-metal wires 11B and the conductive layer 11C, a hydrophobic layer 12 disposed on the valve-metal wires 11B, a conductive unit 13 covering the dielectric structure, a packaging layer 14 and two terminals 15. In detail, adhesive layer 11A is vaporized due to high temperature, and the valve-metal wires 11B and a conductive layer 11C are attached fixedly on the insulating substrate 1. Further, the sintered valve-metal wires 11B and conductive layer 11C are referred to the anode of the solid capacitor. In other words, the valve-metal wires 11B and the conductive layer 11C may be combined as a sintered electrode and the surface of the sintered electrode can be oxidized. In the exemplary embodiment, the insulating substrate 1 has three Ta bars (i.e., the valve-metal wires 11B) disposed across on the two capacitor areas 10. The conductive layer 11C is formed on the valve-metal wires 11B of each capacitor area 10 and used to form the anode contact. The exposed surfaces, such as top surfaces and lateral surfaces of the valve-metal wires 11B and the conductive layer 11C can be transferred to a dielectric structure, i.e., an oxide layer of the valve metals. The conductive unit 13 coves the dielectric structure of each capacitor area 10. The hydrophobic layer 12 is disposed on the valve-metal wires 11B and between the conductive units 13 on the two capacitor areas 10. The hydrophobic layer 12 covers the valve-metal wires 11B to protect the valve-metal wires 11B from the chemicals and liquid in the wet processes. The conductive unit 13 is referred to the cathode of the capacitor and at least has a conductive polymer layer. For example, one or multi conductive layers is electrically connected to the conductive polymer layer for pulling out of the cathode contact. The packaging layer 14 covers the substrate 1 and capacitor structures, such as the anode, the cathode and the dielectric layer, and further exposes the partial portion of the anode and the cathode. As shown in FIG. 9, the packaging layer 14 covers the middle portion of the solid capacitor, and the two ends of the solid capacitor are exposed. The terminals 15 are formed on the exposed portions of the anode and the cathode so as to form the anode contact and the cathode contact. In addition, the terminals 15 further have solderable or weldable surfaces.

The present invention at least has the following characteristics.

1. The instant disclosure provides a large scale batch manufacturing method for solid capacitors so that the manufacturing efficiency is improved. The manufacturing cost may be reduced.

2. The capacitors of the instant disclosure have good electrical properties. The thickness of the final product is controlled between 0.6 to 0.9 mm. Comparing to the traditional capacitor of 1.9 mm, the size of the capacitor is reduced so that the capacitors of the instant disclosure may be suitable for small electronic products.

The description above only illustrates specific embodiments and examples of the present invention. The present invention should therefore cover various modifications and variations made to the herein-described structure and operations of the present invention, provided they fall within the scope of the present invention as defined in the following appended claims.

What is claimed is:

1. A manufacturing method of solid capacitors, comprising the steps of:
providing an insulating substrate having at least two capacitor areas;
providing a first formation step for forming an adhesive layer having a valve metal on the capacitor areas respectively;
providing a plurality of valve-metal wires on the adhesive layer;
providing a second formation step for forming a conductive layer having the valve metal on the capacitor areas respectively, the conductive layer covering the adhesive layer and the valve-metal wires;
providing an auxiliary conductive unit for an electrolytic oxidation treatment, wherein the auxiliary conductive unit is electrically connected with the valve-metal wires, and a dielectric structure is formed on the exposed surface of the valve-metal wires and the conductive layer;
forming a hydrophobic layer on the valve-metal wires, and forming a conductive unit to cover the dielectric structure;
providing a cutting step to separate the two capacitor areas;
providing a packaging step; and
providing a step for forming terminals.

2. The manufacturing method as claimed in claim 1, wherein the valve metal is tantalum, niobium or mixture of tantalum and niobium.

3. The manufacturing method as claimed in claim 1, wherein in the step of providing an auxiliary conductive unit, an auxiliary conductive metal layer is formed by a spattering method and electrically connected with the valve-metal wires, or a conductive tool is used and electrically connected with the valve-metal wires.

4. The manufacturing method as claimed in claim 1, wherein in the electrolytic oxidation treatment, the dielectric structure is an oxide layer which is formed on the exposed surface of the valve-metal wires and the conductive layer via an electrical-chemical method.

5. The manufacturing method as claimed in claim 1, further comprising a sintering step after the second formation step.

6. A manufacturing method of solid capacitors, comprising the steps of:
providing an insulating substrate having at least two capacitor areas;
providing a first formation step for forming an adhesive layer having carbon material on the capacitor areas respectively;
providing a plurality of valve-metal wires on the adhesive layer;
providing a second formation step for forming a conductive layer having the valve metal on the capacitor areas respectively, the conductive layer covering the adhesive layer and the valve-metal wires;
providing an auxiliary conductive unit for an electrolytic oxidation treatment, wherein the auxiliary conductive unit is electrically connected with the valve-metal wires, and a dielectric structure is formed on the exposed surface of the valve-metal wires and the conductive layer;
forming a hydrophobic layer on the valve-metal wires, and forming a conductive unit to cover the dielectric structure;
providing a cutting step to separate the two capacitor areas;
providing a packaging step; and
providing a step for forming terminals.

7. The manufacturing method as claimed in claim 6, wherein the valve metal is tantalum, niobium or mixture of tantalum and niobium.

8. The manufacturing method as claimed in claim 6, wherein in the step of providing an auxiliary conductive unit, an auxiliary conductive metal layer is formed by a spattering method and electrically connected with the valve-metal wires, or a conductive tool is used and electrically connected with the valve-metal wires.

9. The manufacturing method as claimed in claim 6, wherein in the electrolytic oxidation treatment, the dielectric structure is an oxide layer which is formed on the exposed surface of the valve-metal wires and the conductive layer via an electrical-chemical method.

10. The manufacturing method as claimed in claim 6, further comprising a sintering step after the second formation step, wherein the adhesive layer is vaporized in the sintering step.

* * * * *